United States Patent [19]

Dischert et al.

[11] Patent Number: 4,677,483
[45] Date of Patent: Jun. 30, 1987

[54] INTERPOLATION FILTER WITH MOTION COMPENSATION

[75] Inventors: Robert A. Dischert, Burlington, N.J.; Robert J. Topper, Philadelphia, Pa.

[73] Assignee: RCA Corporation, Princeton, N.J.

[21] Appl. No.: 780,944

[22] Filed: Sep. 27, 1985

[51] Int. Cl.⁴ .............................................. H04N 7/00
[52] U.S. Cl. ....................................... 358/140; 358/11
[58] Field of Search ......................... 358/11, 140, 21 R

[56] References Cited

U.S. PATENT DOCUMENTS

| | | | |
|---|---|---|---|
| 3,051,778 | 8/1962 | Graham | 358/133 |
| 4,400,719 | 8/1983 | Powers | 358/21 R |
| 4,415,931 | 11/1983 | Dischert | 358/242 |
| 4,598,309 | 7/1986 | Casey | 358/11 |

FOREIGN PATENT DOCUMENTS 2111343  6/1983  United Kingdom .

*Primary Examiner*—James J. Groody
*Assistant Examiner*—Robert M. Bauer
*Attorney, Agent, or Firm*—P. J. Rasmussen; P. M. Emanuel; R. G. Coalter

[57] ABSTRACT

A progressive scan receiver includes a frame interpolation filter for generating added lines for display in a given field from a video input signal by interpolation from corresponding elements of immediately preceding and following fields. A second filter provides a line interpolated signal having picture elements spatially and temporally coincident with corresponding elements of the frame interpolated signal and having a suppressed vertical detail component. A third filter attenuates the vertical detail component of the frame interpolated signal. An output circuit combines the signals of the three filters to provide a frame interpolated video output signal in which the vertical resolution of the video input signal is preserved and motion artifacts characteristic of frame interpolation are attenuated.

20 Claims, 6 Drawing Figures

INTERPOLATION FILTER WITH MOTION COMPENSATION

FIELD OF THE INVENTION

This invention relates to video signal processing and particularly to filters for providing a processed video output signal in which picture elements of a current field are provided by interpolation of corresponding elements of immediately preceding and following fields and which includes compensation for motion induced artifacts.

BACKGROUND OF THE INVENTION

The interpolation filter of the present invention is of general utility and is particularly useful for generating additional horizontal lines for display in a "line doubling" or progressively scanned television display system. In one form of progressive scan system the horizontal scan rate is multiplied, i.e., doubled, and each line of video is displayed twice thereby providing a displayed image having reduced visibility of line structure. An example of such a progressively scanned receiver, wherein the added lines of video signal are replicas of the original scan lines, is described in U.S. Pat. No. 4,415,931 entitled TELEVISION DISPLAY WITH DOUBLED HORIZONTAL LINES which issued Nov. 15, 1983 to R. A. Dischert.

In another form of progressive scan system, the "extra" lines for display are obtained by interpolation of adjacent vertical lines of the incoming video signal. This may be done either before or after "speed-up" (i.e., time compressing) of the video signal in the memory. Examples of progressively scanned display systems in which the additional scan lines are obtained by interpolation from the original scan lines are described by K. H. Powers in U.S. Pat. No. 4,400,719 entitled TELEVISION DISPLAY SYSTEM WITH REDUCED LINE SCAN ARTIFACTS which issued Aug. 23, 1983 and by Yasushi Fujimura et al. in UK Patent application Ser. No. 2,111,343A published June 29, 1983.

It has been recognized (by Powers, for example) that a superior progressive scan image may be obtained in cases where there is no significant scene motion, by using a field memory to delay the incoming video signal by one field. In this way, all 525 lines of an interlaced frame (NTSC assumed) are available for display during each field period thereby avoiding the loss of vertical resolution characteristic of conventional line interpolators. When motion occurs, however, the temporal difference (1/60th. second for NTSC) between the undelayed and field delayed lines causes the edges of moving objects to appear serrated.

The serrated edge effect may be corrected as described by Casey in U.S. Patent application Ser. No. 614,668 filed May 29, 1984 entitled A TELEVISION RECEIVER THAT INCLUDES A FRAME STORE USING NON-INTERLACED SCANNING FORMAT WITH MOTION COMPENSATION, commonly assigned to the assignee of the present invention. In an exemplary embodiment of the Casey apparatus, a motion responsive switch selects a frame comb filtered luminance signal for display during times when little or no motion is present and selects the field-delayed luminance signal (which, additionally, is line-comb filtered) for display otherwise.

Another example of an "adaptive" system that automatically switches between two processing modes is described by Casey et al. in U.S. Patent application Ser. No. 738,974 entitled PROGRESSIVE SCAN PROCESSOR EMPLOYING INTERPOLATION IN THE LUMINANCE CHANNEL filed May 29, 1985. In this system a selector switch selects a field delayed luma image signal for display on the intermediate lines of a display when the vertical detail content of the input signal is greater than a minimum threshold value and there is little or no interframe motion and selects a frame comb filtered and interpolated luminance signal for display otherwise thereby providing enhanced vertical detail and reduced field motion artifacts for displayed images.

SUMMARY OF THE INVENTION

It is recognized herein that adaptive processors which sense motion to automatically switch between intra-field processing (e.g., line comb filtering) and inter-field processing (e.g., field or frame processing) may be subject to switching errors under certain circumstances as, for example, when the signal to noise (S/N) ratio of the video input signal is poor. The visual effect of erratic motion switching under low signal to noise ratio conditions may be manifested as noise in the picture.

A need exists for video processors having the relatively high resolution characteristic of field or frame processors, having the motion artifact immunity characteristic of vertical or intra-field interpolation processors and which avoids switching errors characteristic of motion adaptive systems. The present invention is directed to meeting those needs.

In accordance with a first aspect of the invention, linear filtering techniques are employed to generate interpolated horizontal lines of a video signal for display thereby avoiding switching artifacts characteristic of the aforementioned "adaptive" systems. The invention is embodied in an interpolation filter which operates continuously upon a video signal and is "non-adaptive" in the sense that the filtering parameters are continuous linear functions and are not switched as a consequence of field-to-field motion of image data. Motion artifacts which tend to occur as a consequence of field to field processing of the video signal are continuously suppressed by means of a combination of line and frame comb filters.

An interpolation filter embodying the invention comprises an input terminal for receiving a video input signal to be interpolated. A frame comb filter means, coupled to the input terminal, provides an interpolated video output signal in which picture elements of a given field are generated by interpolation of corresponding elements of immediately preceeding and following fields. A first line comb filter means is coupled to the input terminal for line comb filtering and delaying the video input signal by substantially one field interval to provide a first line comb filtered and delayed video output signal. A second comb filter means is coupled to the frame comb filter means for line comb filtering the interpolated video output signal for providing a second line comb filtered output signal. An output means, coupled to each filter, linearly combines the interpolated video output signal with the line comb filtered signals to provide an interpolated video output signal having reduced motion related artifacts.

In accordance with a further aspect of the invention, the output means includes a further filter means having input means coupled to the two line comb filter means for generating an enhancement signal representative of the edges of objects exhibiting field to field motion and provision is made for adding the moving edge enhancement signal to the interpolated video output signal.

BRIEF DESCRIPTION OF THE DRAWING

The invention is illustrated in the accompanying drawing wherein like elements are identifed by line designators and in which.

DETAILED DESCRIPTION OF THE DRAWING

Figure 1:
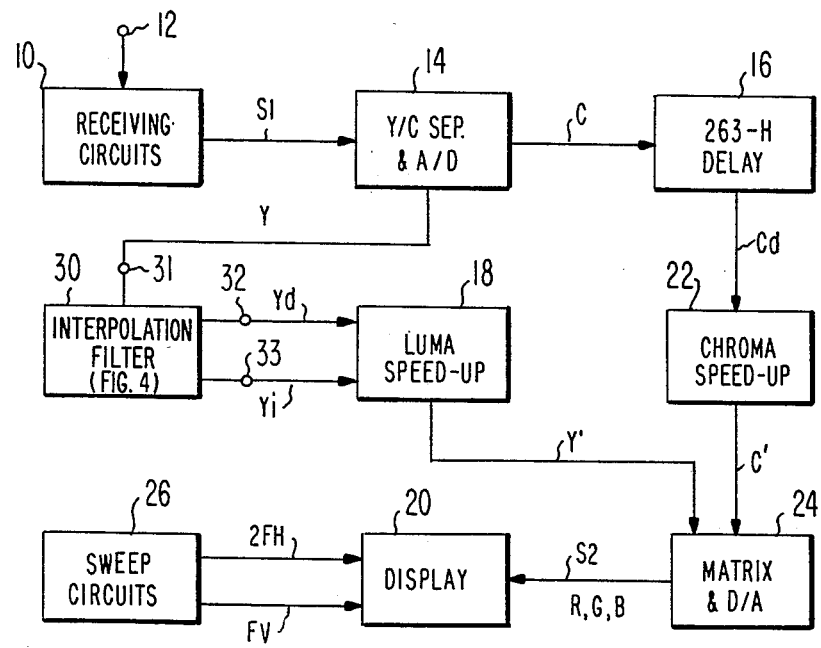
FIG. 1 is a block diagram of a progressive scan television receiver embodying the invention.
Figure 2:
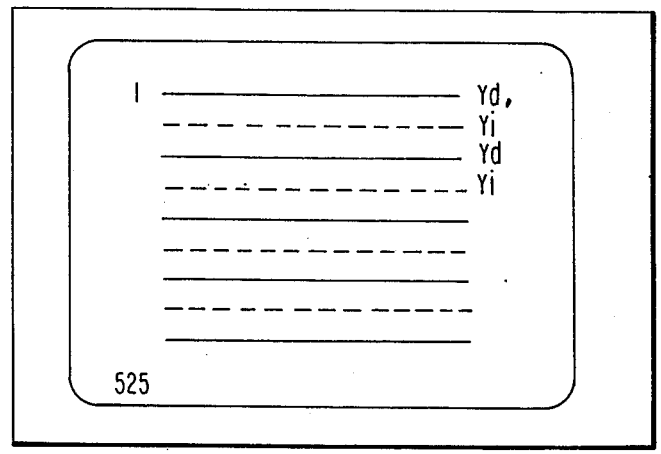
FIG. 2 is a representation of the raster scan lines displayed by the receiver of FIG. 1.

The progressive scan receiver of FIG. 1 represents a preferred application of the use of the interpolation filter 30, embodying the invention, for generating interpolated horizontal lines of a video signal for display in progressive scan fashion along with received (non-interpolated) lines. The raster structure is illustrated in FIG. 2 wherein Yd represents the incoming video signal (delayed, as will be explained) and Yi represents the interpolated lines added to the display to double the number of lines and thereby reduce the visibility of vertical line structure. As shown, the received (Yd) and interpolated (Yi) lines are alternately displayed (interleaved) in the raster.

Figure 3:
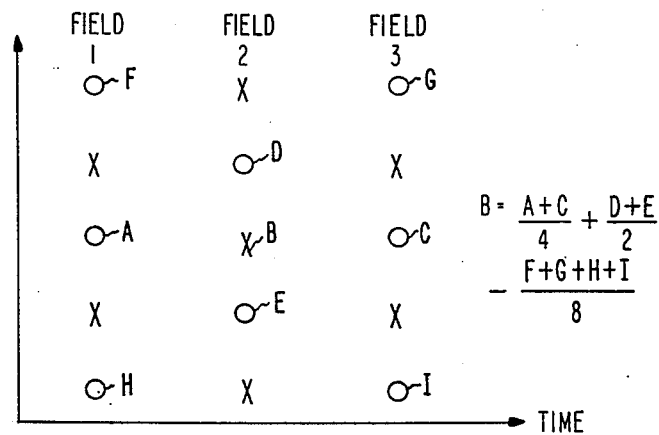
FIG. 3 is a spatio-temporal diagram illustrating field interpolation used in the receiver of FIG. 1.

Interpolation provided by filter 30 is provided on a field basis as shown in FIG. 3 wherein circles represent received video lines and crosses represent field interpolated (Yi) lines. As shown, the value of a picture element (pixel) of an interpolated line B of field 2 is determined by interpolation by averaging corresponding points (A and C) of the immediately preceeding and following fields (fields 1 and 3). When inter field motion occurs, interpolation of this type would normally tend to produce undesirable visual artifacts such as smeared images, double images, blurred edges, etc. In the previously discussed prior art "adaptive" systems, the solution to this problem was to detect interframe motion above a threshold value and switch to vertical interpolation (i.e., averageing the points above and below B) since vertical interpolation, being within a field, exhibits no motion artifacts. It does, however, tend to reduce the vertical resolution. Filter 30, as will be described, is a linear filter which is compensated for motion effects. Accordingly, filter 30 preserves the vertical resolution of the original signal even in the presence of motion and is not subject to the effects of low S/N ratio and detector switching noise previously discussed.

Specifically, the receiver of FIG. 1 comprises a receiving circuit unit 10 of conventional design having an input 12 for connection to an antenna or other suitable video RF source and an output for providing a baseband video output signal S1. Unit 10 may be omitted when the receiver is used as a monitor for sources (e.g., tape recorders) having baseband video outputs. Signal S1 is applied to a luminance/chrominance separator (Y/C) and analog-to-digital (A/D) converter unit 14 of conventional design which provides digitized and separated luminance (Y) and chrominance (C) output signals. It is preferred that the signals be processed digitally to facilitate signal storage in conventional random access memories (RAMs). Alternatively, processing may be provided by other sampled data devices (e.g., charge coupled devices) in which case conversion to digital form is not necessary.

Luma (luminance) signal Y is applied to filter 30 which generates a field delayed luma signal Yd and a frame interpolated luma signal Yi. The total interpolation delay, with motion compensation, is one field plus one-half line (e.g., 263 lines total for NTSC standard input signals). The non-interpolated luma signal Yd is delayed by this amount to ensure proper registration between Yd and Yi when the signals are ultimately displayed on a display unit 20. The chroma (chrominance) signal C is similarly delayed by unit 16. The luma signals Yd and Yi at outputs 32 and 33 of filter 30 are applied to a luma speed-up circuit 18 which time compresses and interleaves the signals to generate a double line rate video output signal Y'. Unit 18 may be of conventional design such as the parallel organized first-in first-out (FIFO) buffers described in the aforementioned Powers Pat. No. (4,400,719). The chroma signal is also applied to a speed-up unit 22 which doubles the chroma line rate to provide a time-compressed double line-rate chroma output signal C'. For purposes of chroma processing, it is sufficient that the chroma signal simply be repeated to double its line rate. Dischert describes suitable line repeating processors in his aforementioned Pat. No. 4,415,931. Alternatively, the chroma signal may be processed in the same manner as the luma signal. Another alternative would be to decode signal S1 to R,G,B components or Y, I, Q components or Y, B−Y, R−Y components and process all components as the luma signal Y.

The double line rate luma Y' and chroma C' signals are applied to a conventional matrix and digital to analog (D/A) converter unit 24 which supplies a video output signal S2 in R,G,B form to display 20 which is synchronized by sweep circuit unit 26 to operate at the field rate, FV, and double the line rate, 2 FH, of the video input signal S1. As previously discribed, unit 20 produces a raster (FIG. 2) in which Yd and Yi alternate in progressive scan fashion with Yi being interpolated from immediately preceeding and following fields as shown in FIG. 3. With the exception of how Yd and Yi are generated, the detailed operation of the receiver is much the same as described in the vertical interpolation progressive scan system described in the Powers Pat. No. (4,400,719) and so will not be repeated here. The differences, as will now be described in detail, are that the present progressive scan system employs linear frame interpolation with motion compensation to preserve vertical resolution while also avoiding switching artifacts characteristic of so-called "adaptive" field or frame progressive scan conversion systems.

Figure 4:
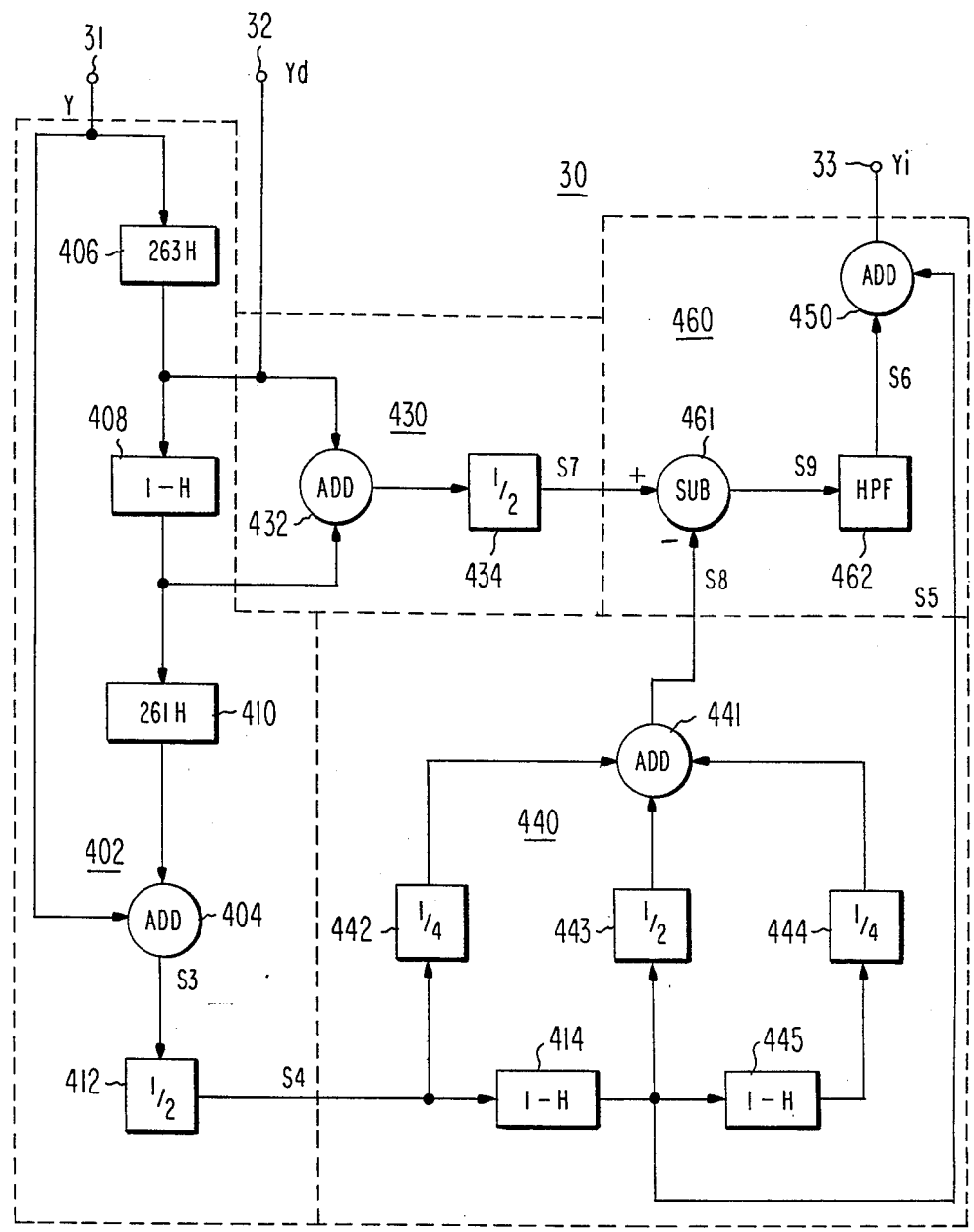
FIG. 4 is a detailed block diagram of an interpolation filter embodying the invention and used in the receiver of FIG. 1.

FIG. 4 shows the details of a first embodiment of filter 30 which, as will be explained, actually comprises several filters and also provides the delay necessary to ensure proper registration of the interpolated (Yi) and non-interpolated (Yd) signals. The filter comprises an input terminal 31 for receiving the luma signal Y to be interpolated from unit 14. Input terminal 31 is coupled to the input of a frame comb filter (indicated generally as 402) comprising an adder 404 having a first input connected directly to terminal 31 and a second input connected to terminal 31 via a cascade connection of three delay units (406, 408 and 410) having delays (from terminal 31) of 263 H, 1−H and 261 H where H corresponds to one horizontal line. The total delay is thus one frame (525 lines in the NTSC system) and the output signal (S4) from adder 404 thus represents the sum of pixels one frame apart. This signal (S3) is attenuated by a factor of two in unit 412 to provide an interpolated output signal S4 for a current field of the input signal equal to (A+B)/2 as shown in FIG. 3. Signal S4 has the full vertical resolution of the input luma signal Y but also is subject to motion artifacts.

The delay of the interpolated signal S4 through filter 402 is equal to one-half of the total delays of units 406, 408, and 410 or 262.5 lines (NTSC assumed). Signal S4 is additionally delayed by a 1-H delay unit 414 to produce a signal S5 which is coupled to output terminal 33 via an adder 450. The signal S5 at the input to adder 450 thus has a total delay of 263.5 lines and represents an interpolated video output signal in which picture elements of a given field (e.g., field 2 of FIG. 3) are generated by averaging of corresponding elements (A and C, FIG. 3) of the immediately preceeding and following fields (e.g., fields 1 and 3, FIG. 3).

Signal S4 (or the signal S5) is subject to motion artifacts since it is the average of two fields. If something moves from field to field the resultant moving object may exhibit serrated edges and smear due to the frame averaging process. This is corrected by means of two line-comb filters 430 and 440 which generate a compensating signal S6 which represents the motion effect within the interpolated field (e.g., field 2 of FIG. 3).

As an overview, the motion compensation signal S6 represents the difference between the frame interpolated field produced by filter 402 and a vertically interpolated field provided by line comb filter 430. In FIG. 3, the point B is frame interpolated by averaging points A and C as previously explained. Filter 430 averages points D and E to provide a vertically or intra-field interpolated estimate of the value of point B. Thus, there are two estimates of the value of point B which are spatially and temporally coincident. The difference between the frame estimate (A+C)/2 and the vertical estimate (D+E)/2 would represent motion between these two spatially and temporally coincident estimates if there were no vertical detail present. Vertical detail is a problem because vertical interpolation attenuates it whereas frame averaging preserves it. In order to detect motion between the vertically interpolated field (D+E)/2 and the frame averaged field (A+C)/2 it is necessary to equalize the vertical detail. This is done by a further line comb filter 440 which attenuates the vertical detail of the frame interpolated signal in approximate to the vertical detail which is lost due to vertical interpolation. This is done, as explained in more detail subsequently, by adding the adding the vertically adjacent lines F, G. H and I to the frame averaged signal (A+C)/2 with weighting coefficients selected to normalize the sum (i.e. the coefficients 0.25, 0.5 and 0.25 add to unity) so that in the absence of motion the output signal S8 of filter 430 will "cancel" the vertically interpolated signal S7 of filter 430 in subtractor 461. With vertical detail suppressed in equal amounts in both the frame comb filtered signal and the line comb (vertically) filtered signal, the difference between the two signals will accurately represent motion between the two spatially and temporally coincident interpolated fields. The difference signal, thus compensated for vertical detail differences, may thus be combined with the frame averaged signal to correct motion artifacts on a continuous basis with no need for adaptively switching to change interpolation modes as in the prior art. Moreover, since the compensating signal only removes motion artifacts, the output signal will still possess the full vertical detail content of the original video input signal.

The first of the line comb filters 430 comprises an adder 432 which adds the input and output signals of delay unit 408 and an attenuator 434 which divides the sum by two. The resultant signal S7 represents the average of lines within a field immediately above and below the interpolated line produced by filter 402. This corresponds to the average of points D and E of FIG. 3. Signal S7 may thus be considered to be a first point of reference for detecting motion of signal S5 since the average of D and E falls at the same point as the average of A and C both spatially and temporally.

Having developed a vertical average signal S7 (D+E/2) which is spatially and temporally coincident with the frame averaged signal S5 (A+B/2), the next step according to the invention, is to extract the vertical detail from signal S4 to generate a signal S8 which corresponds to signal S4 except for attenuated vertical detail. This step is important because signal S4 contains the full vertical detail of the input signal Y but signal S7 has attenuated vertical detail due to vertical averaging. It is significant that motion spectra be separated from vertical detail and this is done by filter 440 which takes the vertical detail out of signal S4.

Filter 440 comprises a three-tap vertical interpolation line comb filter having weighting coefficients of 0.25, 0.5 and 0.25. The filter is constructed by means of an adder 441 having a first input coupled via a ¼ attenuator 442 to the input of delay line 414, a second input coupled to the output of delay line 414 via a ½ attenuator 443 and a third input coupled to the output of line 414 via a cascade connection of an attenuator 444 and another 1-H delay line 445.

It will be noted that line-comb filters 430 and 440 are different structurally. Filter 430 is a "two-tap" filter and filter 440 is a "three-tap" filter. Different filter forms or types are used in order to ensure that the field-delayed line comb filtered signal S7 is in proper time registration with the frame-comb filtered line-comb filtered signal S8. By "registration" it is meant that the overall delay signals S7 and S8 are the same relative to terminal 31. Signal S7 is delayed by 263 lines in delay unit 406 and an additional ½ line in filter 430. Signal S4 is delayed by 262.5 lines at the output of attenuator 412. Filter 440 provides an additional one line delay giving a total delay of 263.5 lines for signal S8. Accordingly, the set delay, for each of signals S7 and S8 is 263.5 lines. Filter 430 provides a vertically interpolated signal with attenuated vertical detail and filter 440 provides a frame interpolated signal with attenuated vertical detail. The difference between signals S7 and S8 (e.g., signal S9 produced by a subtractor 461 in output circuit 460 e.g. subtractor 461, filter 462 and adder 450) thus represents inter frame motion without contamination by vertical detail components of the luma input signal Y.

Figure 5:
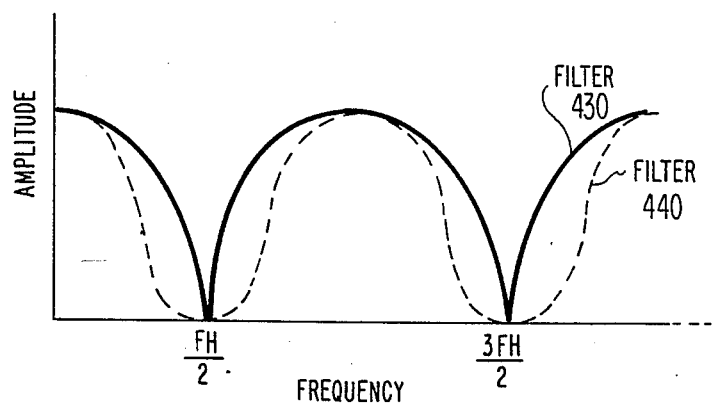
FIG. 5 is a diagram comparing the pass-band characteristics of two line comb filters used in the interpolation filter of FIG. 4.

Although structurally different, the line comb filters 430 and 440 have been selected to provide transfer characteristics which are nearly matched as to their passband characteristics as shown in FIG. 5. Each has a null at an odd multiple of half the line rate of the video input signal (FH/2, 3FH/2, etc.) Two-tap filter 430 has a cycloidial response and three-tap filter 440 has a raised-cosine response as shown. The line comb filters, accordingly, have similar transfer characteristics and exactly matched temporal characteristics (i.e., signals S7 and S8 are equally delayed).

The error (difference) in the transfer characteristics of filters 430 and 440 represented by FIG. 5 represents residual vertical detail component which is removed from signal S9 by means of a high pass filter 462 (e.g., 0.5 MHz) which supplies the motion correction signal S6 to adder 450 in output circuit 460.

To summarize, filter 402 provides a frame interpolated signal S5 having motion artifacts. Filters 430 and 440 provide, respectively, a line comb filtered field delayed signal S7 and a frame comb filtered, line comb filtered signal S8, each line comb filtered signal having attenuated vertical detail. Output unit 460 combines the outputs of all three filters to provide a motion compensated, frame interpolated output signal Yi. Miss-match in the transfer characteristics of the line comb filters is corrected by means of high pass filter 462.

Figure 6:
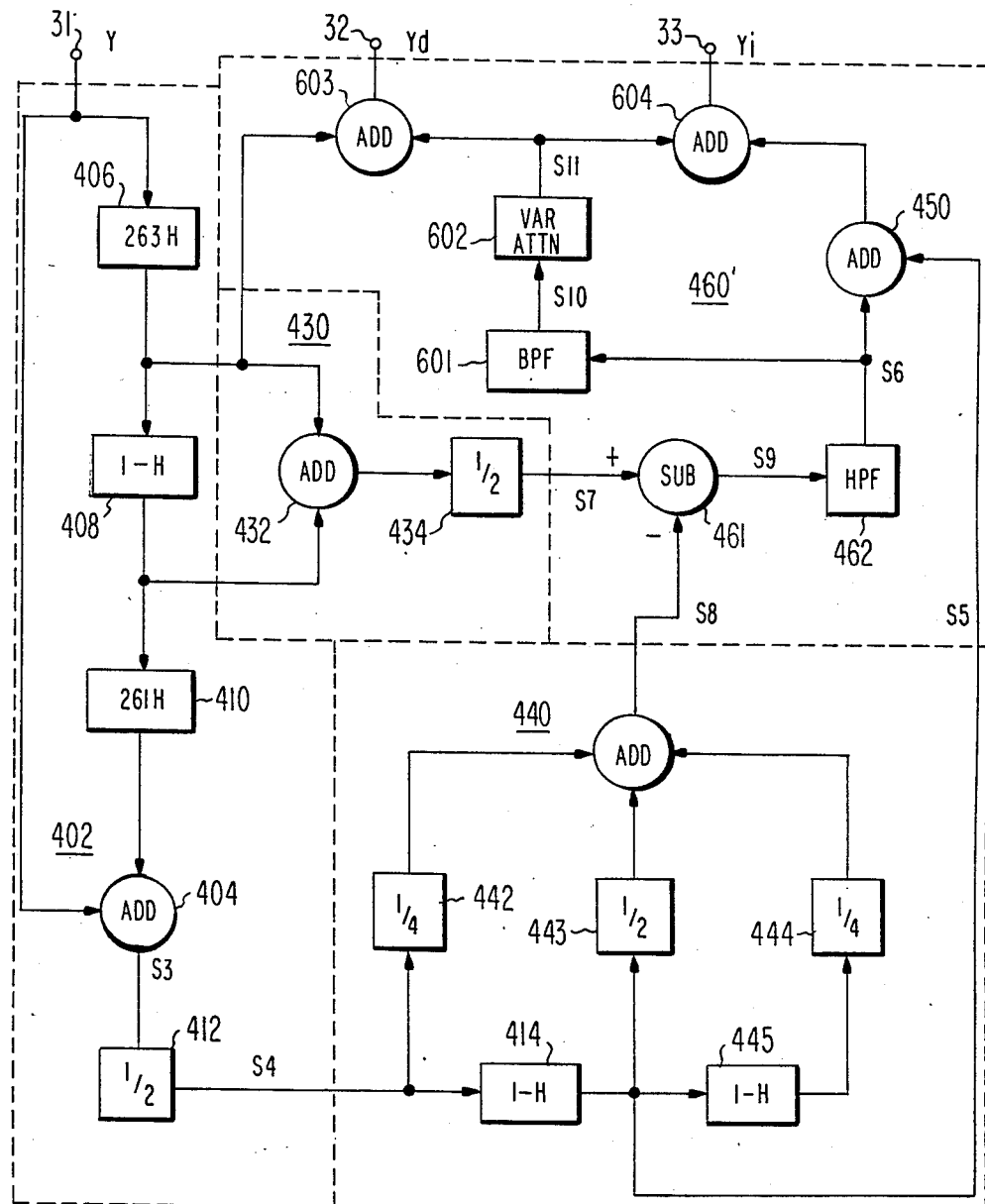
FIG. 6 is a block diagram illustrating a modification of the interpolation filter of FIG. 4 for providing enhancement of edge detail of objects exhibiting inter frame motion.

The filter 30 of FIG. 4 may be modified as shown in FIG. 6 to enhance the detail of the edges of moving objects. Recall that filters 430 and 440 produce signals S7 and S8, respectively, which are used to produce signal S6 which is itself combined with signal S5 to remove motion artifacts produced by frame comb filter 402. In the modified circuit, a bandpass filter 601 having a passband in the general range of 3-4 MHz generates an edge motion indicating signal S10 from signal S6. The amplitude of signal S10 is controlled by a edge-peaking for motion unit control 602 comprising a variable attenuator to provide a variable amplitude motion edge peaking signal S11. Signal S11 is added to signals Yd and Yi by means of adders 603 and 604, respectively, to ensure that edge peaking is added to both the real and interpolated luma signals. In operation, filters 430 and 440 provide motion compensation for signal S5 as previously explained. Units 601–604 peak only the edges of moving objects. The net result is that moving objects have smear removed but retain indications of motion due to the enhanced motion compensated edge information provided by the edge compensation circuits 601–604. It has been found that this produces a subjectively pleasing image.

What is claimed is:

1. An interpolation filter, comprising
input means for receiving a video input signal to be interpolated;
first filter means, coupled to said input means, for providing a frame interpolated video output signal tending to exhibit motion artifacts;
second filter means, coupled to said first filter means, for providing a line interpolated video output signal having picture elements spatially and temporally coincident with corresponding picture elements of said frame interpolated video output signal and having a vertical detail component suppressed by a given amount;
third filter means, coupled to said first filter means, for attenuating a vertical detail component of said frame interpolated video output signal to provide a further video output signal; and
output means for combining the video output signals of said first, second and third filter means for providing a frame interpolated video output signal in which said motion artifacts are attenuated.

2. An interpolation filter as recited in claim 1 wherein said output means includes means for suppressing components below a given frequency of said line interpolated video output signal and said further video output signal.

3. An interpolation filter as recited in claim 1 wherein said third filter means comprises a line comb filter means having a pass-band characteristic similar to that of said second filter means and an effective delay which is different from that of said second filter means.

4. An interpolation filter as recited in claim 1 further comprising fourth filter means having input means coupled to said second and third filter means for generating an enhancement signal representative of edges of moving images and means for adding said enhancement signal to said frame interpolated video output signal of said output means.

5. An interpolation filter as recited in claim 1 wherein one of said second and third filters exhibits a cycloidial response characteristic and the other exhibits a raised cosine response characteristic.

6. An interpolation filter, comprising:
an input terminal for receiving a video input signal to be interpolated;
frame comb filter means, coupled to said input terminal and responsive to said video input signal, for providing an interpolated video output signal in which picture elements of a given field are generated by interpolation of corresponding elements of immediately preceding and following fields;
first line comb filter means, coupled to said frame comb filter means, for line comb filtering and delaying said video input signal by substantially one field to provide a first line comb filtered and delayed video output signal;
second line comb filter means, coupled to said frame comb filter means, for line comb filtering said interpolated video output signal for providing a second line comb filtered output signal; and
output means for combining said interpolated video output signal with said line comb filtered signals to provide an interpolated video output signal having reduced motion artifacts.

7. A filter as recited in claim 6 further comprising further filter means coupled to said line comb filter means for suppressing low frequency components of said first and second line comb filtered signals.

8. A filter is recited in claim 7 wherein said further filter means is coupled to said first and second comb filter means via subtraction means.

9. A filter as recited in claim 6 wherein said first and second line comb filter means comprise respective line comb filters having different numbers of filter taps.

10. A filter as recited in claim 6 further comprising further filter means in said output means having input means coupled to said first and second line comb filter means for generating an enhancement signal representative of edges of objects exhibiting motion and means for adding the moving edge enhancement signal to the interpolated video output signal.

11. A filter as recited in claim 6 further comprising means for delaying said video input signal by substantially one field, means for time compressing the delayed and motion compensated interpolated signals and means for displaying the time compressed delayed and the time compressed motion compensated and interpolated video signals in progressive scan fashion.

12. A filter as recited in claim 6 wherein said first line comb filter means is of a type exhibiting a cycloidial response and said second line comb filter means is of a type exhibiting a raised cosine response.

13. A filter as recited in claim 12 wherein said first line comb filter means comprises a two-tap filter and said second line comb filter means comprises a three tap filter.

14. In a progressive scan display system of the type including interpolation means responsive to a video input signal for providing a delayed video signal and an interpolated video signal to a speed-up means for time compressing said signals and interleaving the time compressed signals for display in progressive scan fashion on a display means, the improvement wherein said interpolator means comprises:

frame comb filter means, responsive to said video input signal, for providing an interpolated video output signal in which picture elements of a given field are generated by interpolation of corresponding elements of immediately preceding and following fields;

first line comb filter means, coupled to said frame comb filter means, for line comb filtering and delaying said video input signal by substantially one field to provide a first line comb filtered and delayed video output signal;

second line comb filter means, of coupled to said frame comb filter means, for line comb filtering said interpolated video output signal for providing a second line comb filtered output signal; and output means for linearly combining said interpolated video output signal with said line comb filtered signals to provide an interpolated video output signal having reduced motion artifacts.

15. A system as recited in claim 14 further comprising further filter means coupled to said line comb filter means for suppressing low frequency components of said first an second line comb filtered signals.

16. A system is recited in claim 15 wherein said further filter means is coupled to said first and second comb filter means via subtraction means.

17. A system as recited in claim 14 wherein said first and second line comb filter means comprise respective line comb filters having different numbers of filter taps.

18. A system as recited in claim 14 further comprising further filter means in said output means having input means coupled to said first and second line comb filter means for generating an enhancement signal representative of edges of objects exhibiting motion and means for adding the moving edge enhancement signal to the interpolated video output signal.

19. A system as recited in claim 14 wherein said first line comb filter means is of a type exhibiting a cycloidial response and said second line comb filter means is of a type exhibiting a raised cosine response.

20. A system as recited in claim 14 wherein said first line comb filter means comprising a two-tap fitler and said second line comb filter means comprises a three top filter.

* * * * *